US006892213B2

United States Patent
Huang et al.

(10) Patent No.: US 6,892,213 B2
(45) Date of Patent: May 10, 2005

(54) DIGITAL SINE/COSINE WAVE GENERATOR (75) Inventors: Tony Chun-Hung Huang, Longmont, CO (US); Hai Thanh Ho, Westminster, CO (US)

(73) Assignee: Seagate Technology LLC, Scott Valley, CA (US)

( * ) Notice: Subject to any disclaimer, the term of this patent is extended or adjusted under 35 U.S.C. 154(b) by 660 days.

(21) Appl. No.: 09/813,243

(22) Filed: Mar. 20, 2001

(65) Prior Publication Data

US 2002/0165889 A1 Nov. 7, 2002

Related U.S. Application Data

(60) Provisional application No. 60/236,315, filed on Sep. 28, 2000.

(51) Int. Cl.[7] .............................................. G06F 7/548
(52) U.S. Cl. ...................................................... 708/276
(58) Field of Search .......................................... 708/276

(56) References Cited

U.S. PATENT DOCUMENTS

| | | | |
|---|---|---|---|
| 3,633,017 A | * | 1/1972 | Crooke ........................ 708/276 |
| 3,649,821 A | | 3/1972 | Gumacos |
| 4,285,044 A | | 8/1981 | Thomas et al. |
| 4,356,558 A | | 10/1982 | Owen et al. |
| 4,577,287 A | | 3/1986 | Chrin |
| 4,888,719 A | * | 12/1989 | Yassa ........................... 708/276 |
| 4,890,172 A | | 12/1989 | Watt et al. |
| 4,910,698 A | | 3/1990 | McCartney |
| 5,121,350 A | * | 6/1992 | Hattangadi et al. ........ 708/276 |
| 5,615,139 A | * | 3/1997 | Asghar et al. ............... 708/276 |
| 5,631,586 A | | 5/1997 | Sogo |
| 5,982,173 A | | 11/1999 | Hagen |
| 6,127,860 A | | 10/2000 | Martin et al. |

OTHER PUBLICATIONS

"Sine Waves", from http://www.interstice.com/~sdattalo/technical/theory/sinewave.html, 7 pages.
"Digital Sine–Wave Generation Using the TMS320C2xx". SPRA179, Jul. 1998, Texas Instruments, 63 pages.

* cited by examiner

*Primary Examiner*—D. H. Malzahn
(74) *Attorney, Agent, or Firm*—Fish & Richardson P.C., P.A.

(57) ABSTRACT

A digital sine/cosine wave generator generates discrete values representative of either a sine wave or a cosine wave. The digital sine/cosine wave generator generates sine and/or cosine waves by implementing a difference equation of the form $y(n)=b*y(n-2)-y(n-1)$. One of the initial conditions of the difference equation is selected from a series of values generated by a coefficient generator. The frequency of the sine and/or cosine wave generated by the sine/cosine wave generator is dependent on, and may be selected according to, which of the series of values generated by a coefficient generator is chosen as an initial condition of the difference equation.

16 Claims, 7 Drawing Sheets

DIGITAL SINE/COSINE WAVE GENERATOR

RELATED APPLICATIONS

This application claims priority of U.S. provisional application Ser. No. 60/236,315 filed Sep. 28, 2000.

FIELD OF THE INVENTION

This application relates generally to sine/cosine wave generation and more particularly to a microprocessor implemented digital sine/cosine wave generator.

BACKGROUND OF THE INVENTION

Sine and cosine wave generators are currently used in number of different applications. For example, sine and cosine wave generators are typically used in communications systems to provide a sine or cosine carrier wave to modulate or demodulate a signal. Sine/cosine generators are also frequently used in system analysis to generate sine and/or cosine waves which are injected into a system to determining the AC characteristics of the system. For example, sine/cosine wave generators are typically employed in a disc drive system to determine the open and closed loop responses of the disc drive servo system. Sine/cosine wave generators may be implemented in either analog or digital circuits. Additionally, sine/cosine generators may be implemented by discrete circuits or by microprocessors.

Discrete analog sine/cosine generators may involve using logarithmic op-amps or other non-linear forms of signal integration to produce a sine or cosine wave. While these circuits are generally inexpensive, sine waves generated in this manner generally have a noticeable amount of distortion. Discrete digital sine/cosine generators may use digital to analog converters to generate a sine wave. For example, sine/cosine wave generators using multiplexers or counters (and sometimes both) are well known. Typically, these types of sine/cosine generators of are unsuitable in smaller applications where reduced circuit size and low cost is desirable or necessary.

A number of programmable sine/cosine wave generators have been devised. Typically, systems of this type generate a number discrete points in digital form by a microprocessor or an array processor. These points are then converted to an analog sine/cosine wave by a digital-to-analog converter circuit. The programming for this type of sine/cosine generator is generally implemented in either software or microcode. Because of the software based nature of such generators and the time required for the code to execute, the process often does not operate fast enough for real time applications. Consequently, those prior art systems often use a memory to store a pre-generated representation of a sine wave, and the data stored in the memory then is clocked out to a digital-to-analog converter at a prescribed rate. If a low distortion sine wave is desired then a substantial amount of non-volatile memory must be provided for storing enough data points (particularly at higher frequencies). As non-volatile memory may greatly increase the cost of a given system, these types of sine/cosine generators are unsuitable in smaller applications where reduced circuit size and low cost is desirable or necessary.

Accordingly there is a need for a non-table derived microprocessor implemented sine/cosine generator.

SUMMARY OF THE INVENTION

Against this backdrop the present invention has been developed. One aspect of the present invention relates to a digital sine/cosine generator having a sine/cosine wave generation module which employs a difference equation to generate either a digital sine wave or a digital cosine wave based on two initial conditions, one of which is received form a coefficient generation module. The difference equation employed by the sine/cosine wave generation module is preferably of the form $y(n)=b*y(n-2)-y(n-1)$. The coefficient generation module preferably generates a series of values representative of a sine wave and a series of values representative of a cosine wave.

Another aspect of the present invention relates to a computer-readable media having stored thereon a computer executable coefficient generation module that generates a series of values according to a function $B(N)=\sin(2\pi NFT)$ and a discrete periodic waveform generation module that receiving one of the series of values generated by the coefficient generation module to generate a discrete periodic waveform utilizing a difference equation.

Yet another aspect of the present invention relates to a method of generating a discrete periodic waveform using a discrete difference equation. The method involves selecting a first value representative of a first initial condition of the difference equation and generating a second value representative of a second initial condition of the difference equation. Based on these initial conditions a sequence of values representative of a periodic waveform are generated using the discrete difference equation and the first and second values as initial conditions.

These and various other features as well as advantages which characterize the present invention will be apparent from a reading of the following detailed description and a review of the associated drawings.

DETAILED DESCRIPTION

In general, the present disclosure describes methods and systems for generating values representative of a sine wave and/or a cosine wave. More particularly, the present disclosure describes a unique microprocessor implemented digital sine/cosine wave generator. More particularly still, the present disclosure describes a microprocessor implemented digital sine/cosine wave generator which utilizes a coefficient generator module to provide starting parameters or coefficients for a sine/cosine wave generator module, such that sine waves and/or cosine waves of different frequencies can be generated. The present disclosure also describes a disc drive system having a digital sine/cosine wave generator operable for injecting a sine wave and/or a cosine wave into a servo loop of a disc drive system such that a frequency response of the servo loop may be determined.

Figure 1:
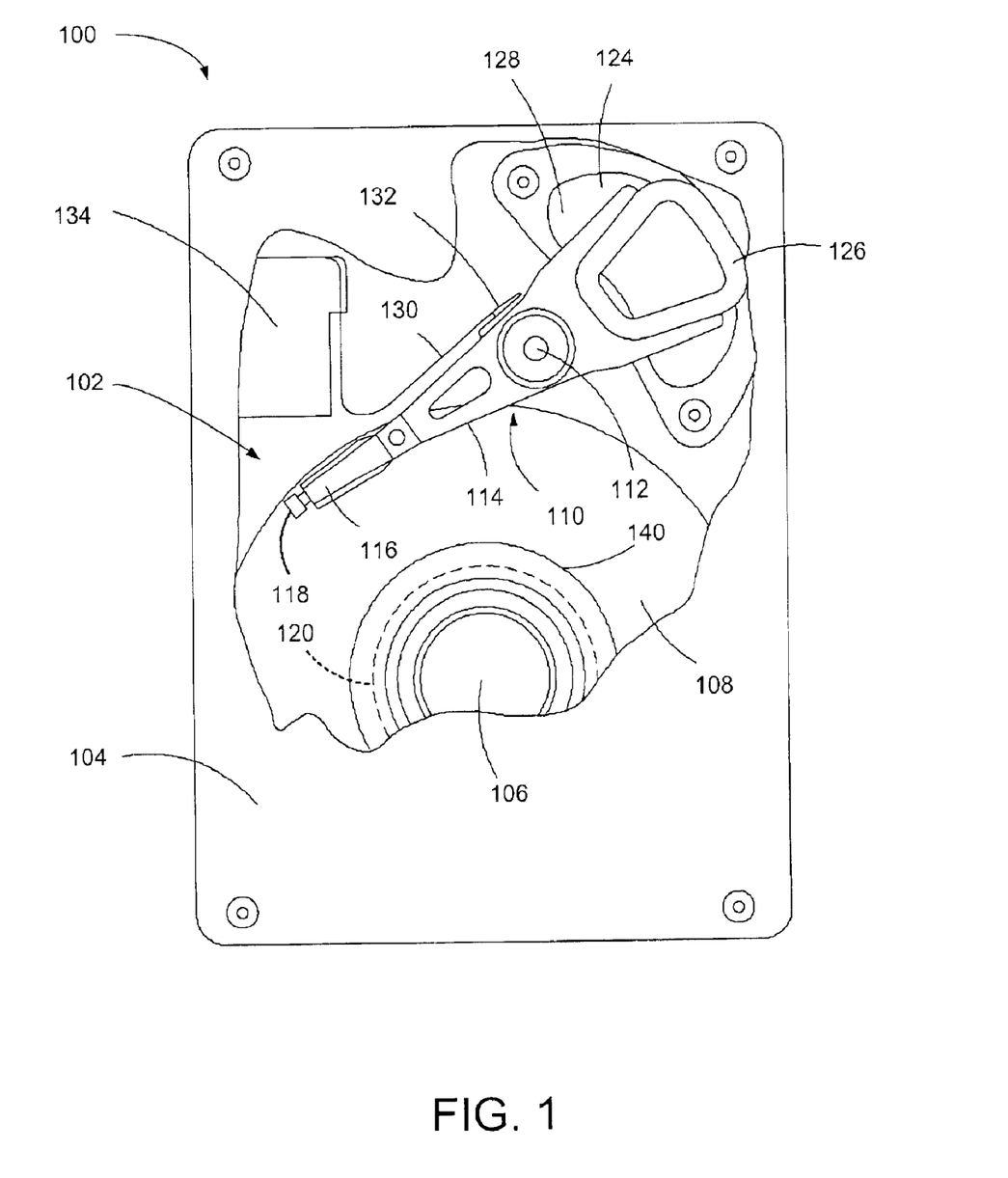
FIG. 1 is a plan view of a disc drive incorporating a preferred embodiment of the present invention showing the primary internal components of the disc drive.

The following is description of an exemplary operating environment embodiment for the present invention. In particular, reference is made to practicing the digital sine/cosine wave generator of the present invention with respect to a processor in a disc drive system such as disc drive 100, as shown in FIG. 1. In such a system the digital sine/cosine wave generator of the present invention may be used to inject a series of sine waves and/or cosine waves into a servo control loop, such as servo loop 300 (FIG. 3), of a disc drive, such as disc drive 100, in order to determine the frequency response of the servo loop. While the digital sine/cosine wave generator of the present invention is described herein with respect to its application in a disc drive, it is to be understood that the digital sine/cosine wave generator of the present invention is not limited to its use in a disc drive environment or to its use in determining system frequency responses. In this respect, the digital sine/cosine wave generator of the present invention may be used in a number of other environments, such as other computing environments and non-disc drive related environments without departing from the scope of the present invention.

A disc drive 100 incorporating a preferred embodiment of the digital sine/cosine wave generator of present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
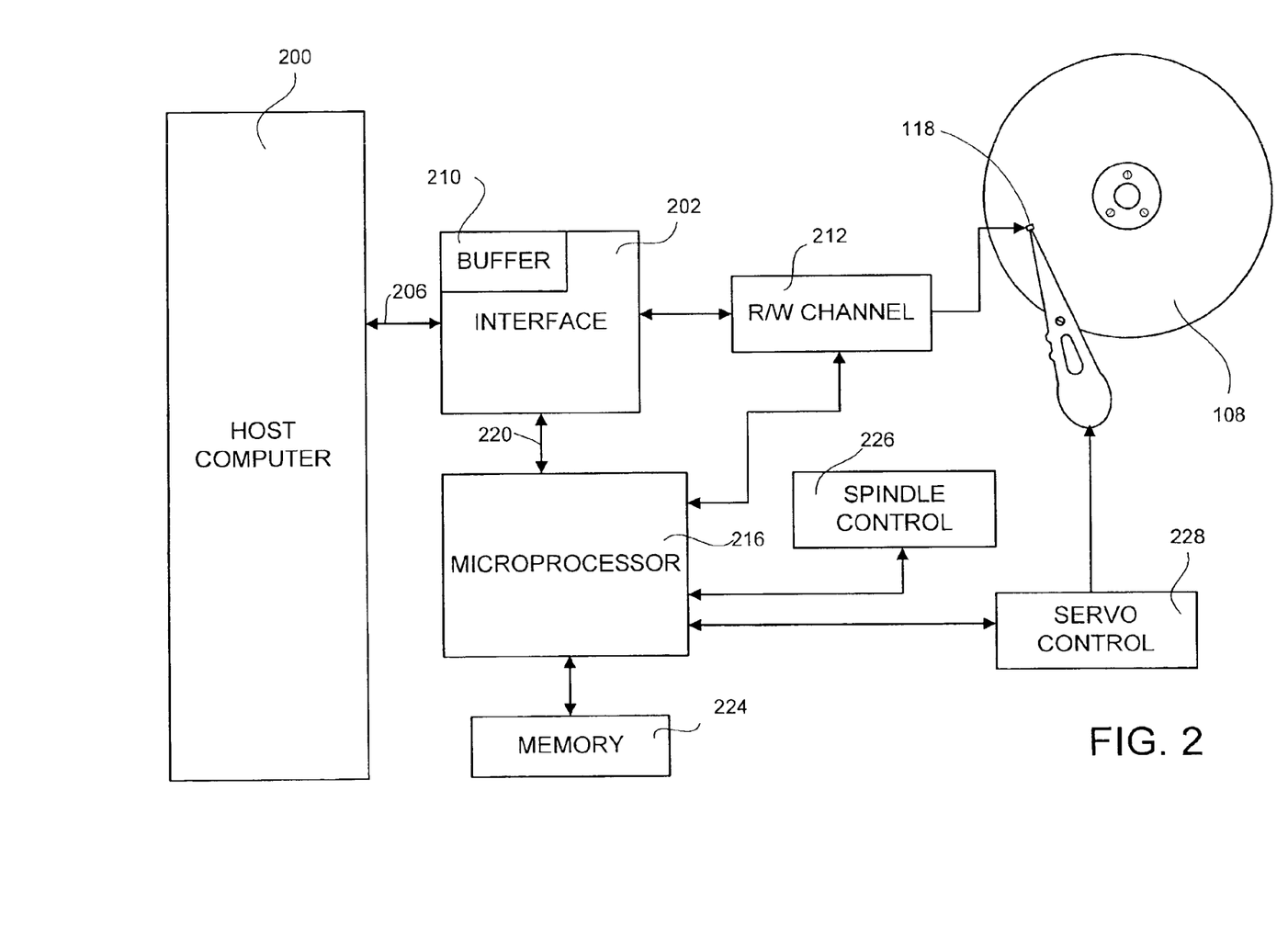
FIG. 2 is a simplified functional block diagram of the disc drive shown in FIG. 1.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host computer 200 is operably connected 206 to an interface application specific integrated circuit (interface) 202 via control lines, data lines, and interrupt lines. The interface 202 typically includes an associated buffer 210 which facilitates high speed data transfer between the host computer 200 and the disc drive 100. Data to be written to the disc drive 100 are passed from the host computer to the interface 202 and then to a read/write channel 212, which encodes and serializes the data and provides the requisite write current signals to the heads 118. To retrieve data that has been previously stored by the disc drive 100, read signals are generated by the heads 118 and provided to the read/write channel 212, which performs decoding and error detection and correction operations and outputs the retrieved data to the interface 202 for subsequent transfer to the host computer 100. Such operations of the disc drive 200 are well known in the art and are discussed, for example, in U.S. Pat. No. 5,276,662 issued Jan. 4, 1994 to Shaver et al.

As also shown in FIG. 2, a microprocessor 216 is operably connected 220 to the interface 202 via control lines, data lines, and interrupt lines. The microprocessor 216 provides top level communication and control for the disc drive 200 in conjunction with programming for the microprocessor 216 which is typically stored in a non-volatile microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228.

Figure 3:
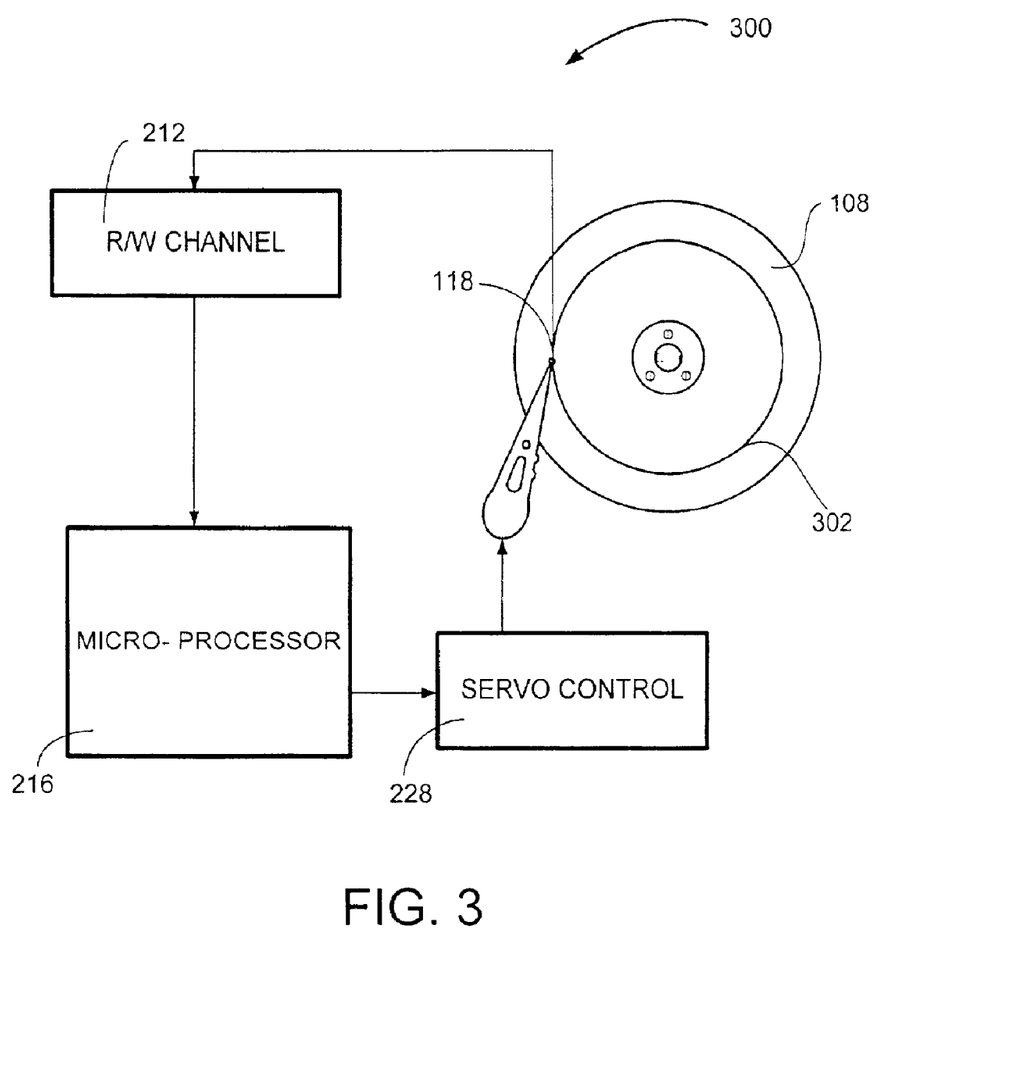
FIG. 3 is a simplified functional block diagram of a servo control loop of the disc drive shown in FIG. 1.

As shown in FIG. 3, the micro-processor 216, the servo control 228, the head 118, and the read/write channel form what is commonly referred to as the servo loop 300 of the disc drive 100. In operation of the disc drive 100, as the head 118 travels over a track 302 on the disc 108, the head reads analog servo information present on the track 302. This servo information, which is indicative of the location of the track 302 on the disc 108, is then amplified and decoded by the read/write channel 212. The read/write channel 212 typically includes an analog to digital converter (ADC) so that selected digital representations of the servo information are provided to the microprocessor 216. The microprocessor 216 generates a position error signal (PES) from the servo information and uses the PES to generate and output a correction signal to a servo control 228. The microprocessor 216 then determines correction signals in accordance with commands and programming steps, which are typically stored in the FLASH/ROM 224. The correction signal is provided to the servo control 228, which includes a power amplifier (not shown) that outputs a controlled dc current of a selected magnitude and polarity to the coil 126 in response to the correction signal. Thus, during track following mode, the servo information indicates the relative position error of the head 118 with respect to the center of the track 302 and the correction signal causes a correction in the dc current applied to the coil 126 in order to compensate for this position error and move the head 118 to the center of the track 140 (or another position relative to the track 302, as desired). For additional discussion concerning the general construction and operation of servo loops, such as servo loop 300, U.S. Pat. No. 5,262,907 entitled HARD DISC DRIVE WITH IMPROVED SERVO SYSTEM, issued Nov. 16, 1993 to Duffy et al., assigned to the assignee of the present invention and incorporated herein by reference, as well as U.S. Pat. No. 5,136,439 entitled SERVO POSITION DEMODULATION SYSTEM, issued Aug. 4, 1992 to Weispfenning et al., assigned to the assignee of the present invention and incorporated herein by reference.

Preferably, the logical operations of the various embodiments of the sine/cosine generator of the present invention are implemented as a sequence of computer implemented steps or program modules running on a microprocessor, such as microprocessor 216. It will be understood to those skilled in the art that the sine/cosine generator of the present invention may also be implemented as interconnected machine logic circuits or circuit modules within a computing system. The implementation is a matter of choice dependent on the performance requirements of the computing system implementing the sine/cosine generator. Accordingly, the logical operations making up the embodiments of the sine/cosine generator of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Preferably, the operation of the sine/cosine generator of the present invention, is controlled by operating code which is typically stored in some type of computer readable media. Typically, the microprocessor 216 retrieves the operating code from the computer readable media and executes the operating code when appropriate. Computer-readable media can be any available media that can be accessed by the microprocessor 216. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 200.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
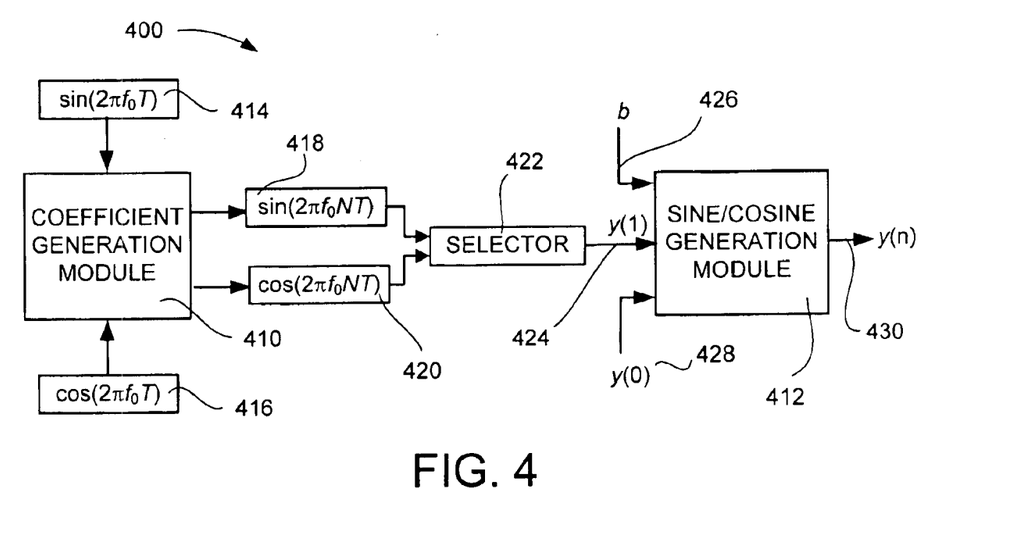
FIG. 4 depicts a digital sine/cosine wave generator in accordance with the present invention.

As shown in FIG. 4, an embodiment a digital sine/cosine wave generator 400 of the present invention comprises a coefficient generation module 410 and a sine/cosine generation module 412. In general terms, the sine/cosine generation module 412 is functional to produce a series of discrete numbers at its output 430 that are representative of values along either a sine wave or a cosine wave. The frequency of the discrete time sine and/or cosine wave generated by the sine/cosine wave generation module 412 is dependent on the values received at inputs 424, 426, and 428 to the sine/cosine wave generation module 412. As described in greater detail below, the coefficient generation module 410 is functional to generate appropriate input values to the sine/cosine generation module 412 such that various discrete frequency of sine and/or cosine waves may be generated by the sine/cosine wave generation module 412.

As shown in FIG. 4, the coefficient generation module 410 receives as inputs the value of $\sin(2\pi f_0 T)$ 414 and the value of $\cos(2\pi f_0 T)$ 416, where $f_0$ is a predetermined frequency and T is a specified tolerable granularity (period between successive intervals–typically below $\frac{1}{2} * f_0$, or the Nyquist frequency of the system). The values $f_0$ and T are preferably predetermined in accordance with the operating parameters of the digital sine/cosine wave generator 400 and stored in computer readable media, such as buffer 210, memory 224, or registers within the microprocessor 216. In a manner described in greater detail below, the coefficient generation module 410 uses the values 414 and 416 to generate as an output two values, $\sin(2\pi f_0 NT)$ 418 and $\cos(2\pi f_0 NT)$ 420. The values 418 and 420 are preferably stored in computer readable media, such as buffer 210, memory 224, or registers within the microprocessor 216. Selector 422 selects either value 418 or 420 for input 424 into the sine/cosine generation module 412, as variable y(1).

In addition to variable y(1), the sine/cosine generation module 412 also receives as one input 426 a constant b and as another input 428 variable y(0). In a manner described in greater detail below, the sine/cosine wave generation module 412 uses the values of the constant b, the variable y(1), and the variable y(0) to generate a series of discrete numbers as an output 430 y(n) that is representative of values along either a sine wave or a cosine wave. The variable y(1), the constant b, and the variable y(0) are all preferably stored in computer readable media, such as buffer 210, memory 224, or registers within the microprocessor 216. Whether the output 430 y(n) will include the values of a sine wave or a cosine wave is dependent on the value 418 or 420 selected by selector 422 and delivered to input 424 of the sine/cosine generation module 412 as variable y(1). For example, if the value $\sin(2\pi f_0 NT)$ 418 is input into the sine/cosine generation module 412 as variable y(1) and a value of zero is input into the sine/cosine generation module 412 as variable y(0), the values generated by the sine/cosine generation module 412 output as y(n) will be representative of a sine wave. Alternatively, if the value $\cos(2\pi f_0 NT)$ 420 is input into the sine/cosine generation module 412 as variable y(1) and the value one is input as variable y(0), the values generated by the sine/cosine generation module 412 and output as y(n) will be representative of a cosine wave.

Figure 5:
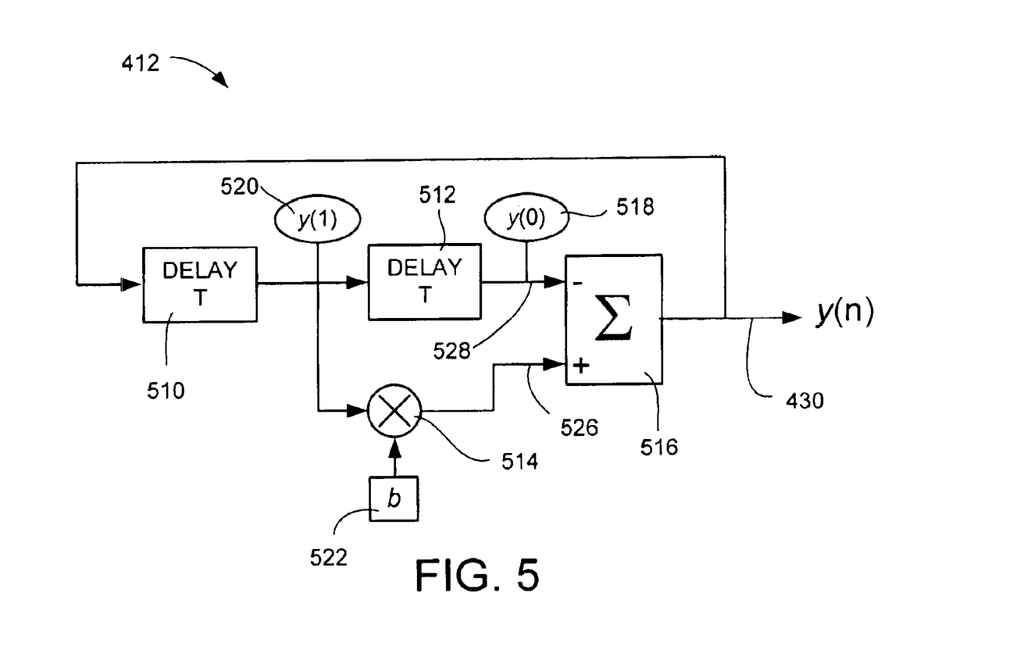
FIG. 5 depicts an embodiment of a sine/cosine generation module of the digital sine/cosine wave generator shown in FIG. 4.

Turning now to FIG. 5, in describing the operation of the digital sine/cosine wave generator 400 it is helpful to look first at the operation of the sine/cosine generation module 412. As is known in the art, the z-transform is a basic tool for both the analysis and implementation of discrete-time systems. As such, the z-transform is useful in analyzing and implementing various routines in digital hardware, such as microprocessors or microprocessor based systems. As is also well known, a linear system's characteristics are completely specified by the system's impulse response, as governed by the mathematics of convolution. With this in mind we may state that the output to the following equation results in a sine wave having an amplitude A and a frequency f when the input to the equation is a unit impulse:

$$\frac{Y(z)}{U(z)} = A \frac{\sin(2\pi fT)z}{z^2 - 2\cos(2\pi fT)z + 1} \quad (1)$$

Similarly, we may state that the output to the following equation results in a cosine wave having an amplitude A and a frequency f when the input to the equation is a unit impulse:

$$\frac{Y(z)}{U(z)} = A \frac{z(z - \cos(2\pi fT))}{z^2 - 2\cos(2\pi fT)z + 1} \quad (2)$$

As the denominators for equation (1) and equation (2) are identical, both equation (1) and equation (2) may also be expressed by the following difference equation $$y(n) = by(n-1) - y(n-2) \quad (3)$$

where $b = 2\cos(2\pi fT)$ and the initial conditions of the difference equation (3) are $y(1) = \sin(2\pi NfT)$ and $y(0) = 0$ for the generation of a sine wave, and $y(1) = \cos(2\pi NfT)$ and $y(0) = 1$ for the generation of a cosine wave.

FIG. 5 illustrates a realization of difference equation (3). As shown in FIG. 5, the sine/cosine generation module 412 includes a first delay element 510, a second delay element 512, a multiplier 514, and a summer 516. As described above, inputs to the sine/cosine generation module 412 include a predetermined value y(0) 428 indicative of an initial value of the sine or cosine wave that is to be generated, a predetermined value y(1) 424 indicative of a second value of the sine or cosine wave that is to be generated, and a constant value b 426. The constant b 426 is preferably has a value of $2\cos(2\pi f_0 T)$, where $f_0$ is a predetermined frequency and T is a specified tolerable granularity (period between successive intervals—typically below $\frac{1}{2} \cdot f_0$, or the Nyquist frequency of the system).

The sine/cosine generation module 412 is preferably implemented as operating code on the microprocessor 216 of the disc drive 100. The operating code of the sine/cosine generation module 412 is preferably stored in some type of computer readable media, such as microprocessor memory (MEM) 224.

As shown in FIG. 5, in operation of the sine/cosine generation module 412, the initial values y(0) and y(1) are set to predetermined values, as described above depending on whether a sine wave or a cosine wave is desired at output y(n). As the operation of the sine/cosine generation module 412 proceeds the values of y(0) 518 and y(1) 520 will be replaced in accordance with the functioning of the sine/cosine generation module 412, as described below.

As shown in FIG. 5, multiplier 514 multiplies the value y(1) 424 by the constant b 426. The output of the multiplier 514 is then fed to the positive input 526 of the summer 516. Likewise, the value of y(0) 428 is fed to the negative input 528 of the summer 516. As a result of the summing operation carried out by the summer 516, the output of the summer 516 is then y(n)=by(1)-y(0). As also shown in FIG. 5, after a predetermined delay cause by delay 510, the value of y(1) is replaced by the value y(n)=by(1)-y(0). Similarly, after a predetermined delay caused by delay 512, the value of y(0) is replaced by the initial value of y(1), or $\sin(2\pi f_0 NT)$. The operation of the sine/cosine generation module 412 then continues on in a similar manner, with the value of y(1) being multiplied 514 by the coefficient b 426 and added 516 to the negative of the value of y(0), and so on until the operation of the sine/cosine generation module 412 is halted.

Figure 6:
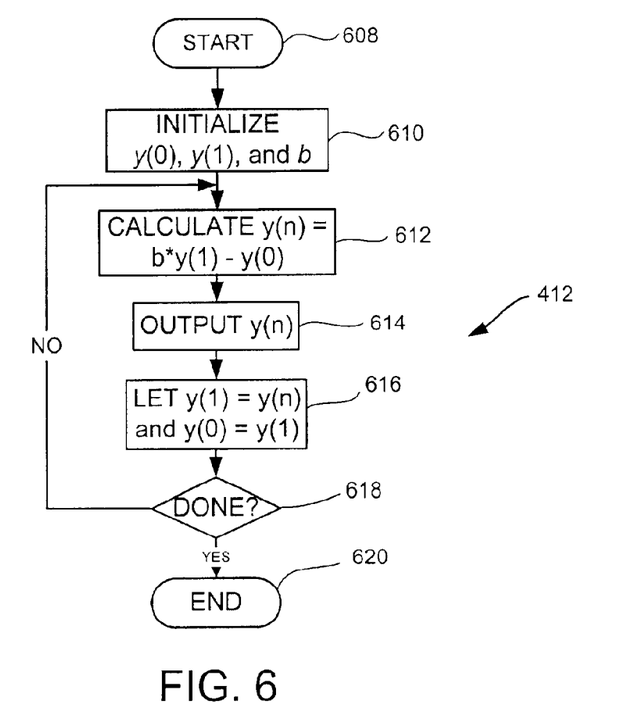
FIG. 6 depicts a flowchart for operations of the sine/cosine generation module shown in FIG. 5.

The operational flow of the sine/cosine generation module 412, and thus an implementation of the difference equation (3), may alternatively be shown with respect to the flow diagram of FIG. 6. As shown in FIG. 6, at the start 608 of the operational flow of the sine/cosine generation module 412, initialization operation 610 initializes the values of y(0), and y(1) as described above, depending on whether a sine wave or a cosine wave is desired at output y(n). As described in greater detail below, the initial values for y(0) and y(1) will be set by the coefficient generation module 410.

Following the initialization of the of y(0), y(1), and b, calculate operation 612 calculates y(n)=by(1)-y(0) using the values for y(0), y(1), and b set by initialization operation 610. Next, output operation 614 outputs the value of y(n) as calculated by calculate operation 612. Following output operation 614, set operation 616 sets the y(1) equal to the value of y(n) previously calculated by calculate operation 612 and sets the y(0) equal to the value of y(1) as initialized at initialization operation 610. Determination operation 618 then ascertains whether operation of the sine/cosine generation module 412 has been completed. The determination of whether operation of the sine/cosine generation module 412 has been completed is preferably based on user defined criteria, such as whether values corresponding to a full sweep, or a number of full sweeps, of a sine wave have been output by the output operation 614. If the user defined criteria for the completion of the sine/cosine generation module 412 is met, operation of the sine/cosine generation module 412 is ended 620. If the user defined criteria is not met, the operational flow of the sine/cosine generation module 412 is directed back to the calculate operation 612 and y(n)=by(1)-y(0) is again calculated using the values for y(0), y(1), as set during the previous execution of set operation 616, followed by an output of the new value of y(n) by the output operation 614. Following output operation 614, set operation 616 sets the y(1) equal to the value of y(n) previously calculated by calculate operation 612 and sets the y(0) equal to the value of y(1) as set by the previous execution of the set operation 616. The calculate operation 612, the output operation 614, the set operation 616, and the determination operation 618 are continued in this manner until the user defined criteria for the completion of the sine/cosine generation module 412 have been met, at which time the operation of the sine/cosine generation module 412 is ended 620.

Figure 7:
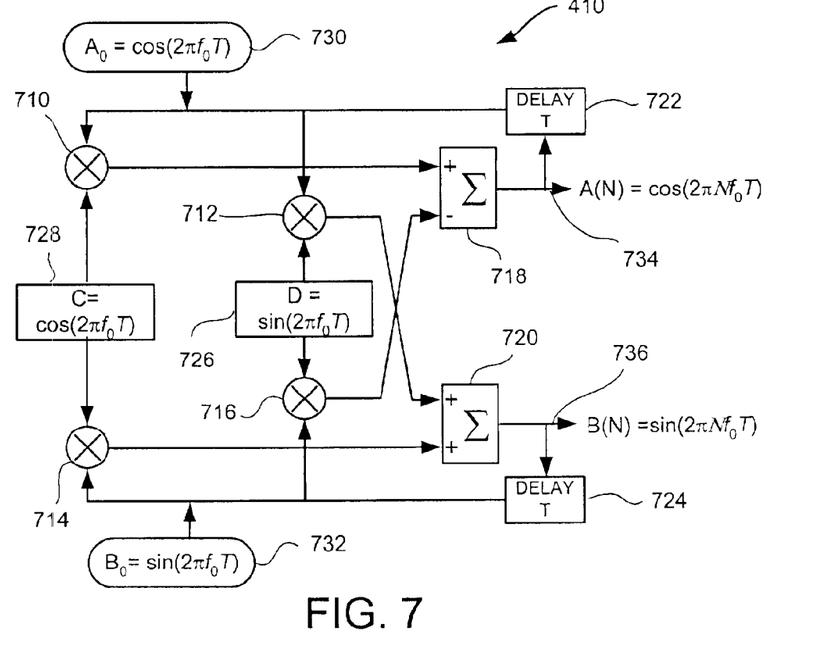
FIG. 7 depicts a coefficient generation module of the digital sine/cosine wave generator shown in FIG. 4.

Turning now to the operation of the coefficient generation module 410. As shown in FIG. 7, the coefficient generation module is in itself a sine/cosine generator. In operation the coefficient generation module 410, as shown in FIG. 7, employs the following well known trigonometric identities to generate sine waves and cosine waves:

$$\sin(a+b) = \sin(a)\cos(b) + \cos(a)\sin(b) \quad (4)$$

$$\cos(a+b) = \cos(a)\cos(b) - \sin(a)\sin(b) \quad (5)$$

As shown in FIG. 7, the coefficient generation module 410 includes four multipliers 710, 712, 714, and 716, two summers 718, 720, and two delay units 722, 724. The coefficient generation module 410 receives as a first input $\sin(2\pi f_0 T)$ 726 and as a second input $\cos(2\pi f_0 T)$ 728. Additionally, the coefficient generation module 410 is initialized with the values $B(N)=\sin(2\pi f_0 T)$ 732 and $A(N)=\cos(2\pi f_0 T)$ 730. The input values 726 and 728 and the initialization values 732 and 730 are preferably stored in computer readable media, such as buffer 210, memory 224, or registers within the microprocessor 216. As shown in FIG. 7, the coefficient generation module 410 outputs both $B_0=\sin(2\pi f_0 T)$ 736 and $A_0=\cos(2\pi f_0 T)$ 734. As such, the coefficient generation module 410 outputs both a series of discrete values indicative of a sine wave 734 and a series of discrete values indicative of a cosine wave 736.

Figure 8:
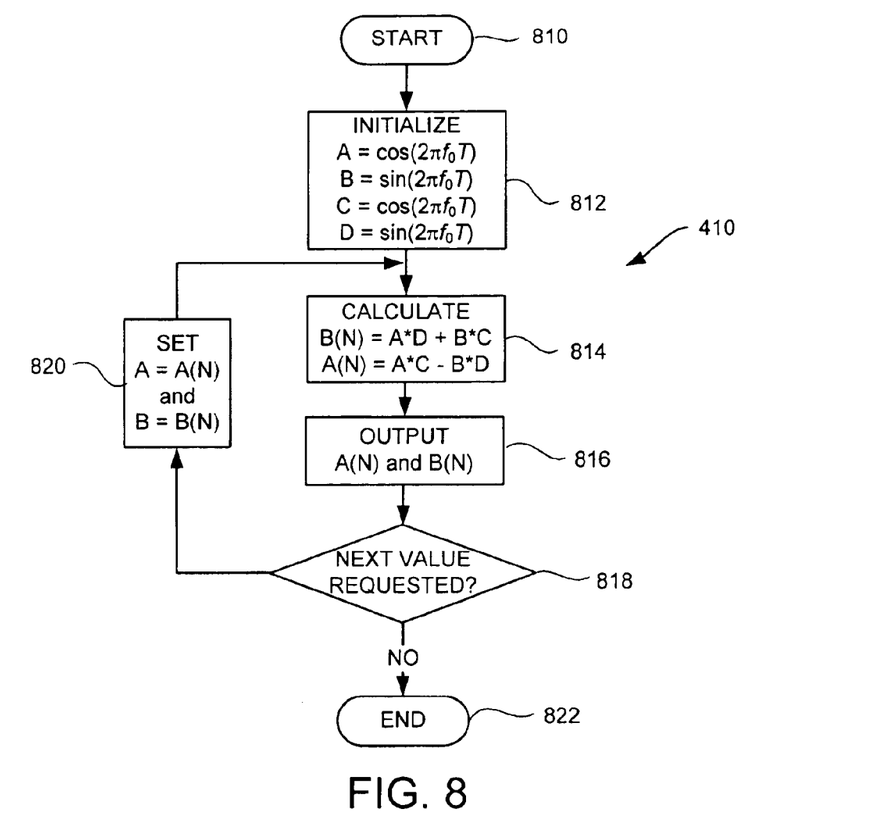
FIG. 8 depicts a flowchart for operations of the coefficient generation module shown in FIG. 5.

The operational flow of the coefficient generation module 410, may alternatively be shown with respect to the flow diagram of FIG. 8. As shown in FIG. 8, at the start 810 of the coefficient generation module 410, initialization operation 812 initializes: $A=\cos(2\pi f_0 T)$; $B=\sin(2\pi f_0 T)$; $C=\cos(2\pi f_0 T)$; and $D=\sin(2\pi f_0 T)$. The values 726 of A, B, C, and D are preferably stored in computer readable media, such as buffer 210, memory 224, or registers within the microprocessor 216. Next, calculate operation 814 calculates $B(N)=A*D+B*C$ and $A(N)=A*C-B*D$ and stores the results of these operations. The output operation 816 then outputs the values of A(N) and B(N) to the outputs 734 and 736, respectively, as shown in FIG. 7. Determination operation 818 then determines if the next value has been requested. That is, a determination is made as to whether the next discrete value, or data point, along the sine or cosine waves being generated by the coefficient generation module 410 have been requested. If the next data point has been requested, set operation 820 sets $A=A(N)$ and $B=B(N)$, the operational flow of the coefficient generation module 410 is returned the calculate operation 814 and the operational flow of the coefficient generation module 410 continues on as shown in FIG. 8. If, on the other hand, the next data point has not been requested, the operational flow of the coefficient generation module 410 is ended 822. Inherent in the operation of the coefficient generation module 410, is that during each iteration of the module 410, that is, each pass through the operations 814, 816, 818, and 820 the value of N is incremented, such that $B(N)=\sin(2\pi N f_0 T)$ and or $A(N)=\cos(2\pi N f_0 T)$, where N is the number of iterations of operations 814, 816, 818, and 820.

As described earlier, the coefficient generation module 410 provides appropriate input values to the sine/cosine generation module 412 such that the various frequency of discrete sine and/or cosine waves may be generated by the sine/cosine wave generation module 412. Stated another way, the sine/cosine generation module 412 is operable to generate a series of discrete values which are representative of either a sine wave or a cosine wave. As shown in FIG. 4, in order to generate these sine or cosine wave values, the sine/cosine generation module 412 must initially be provided two data points, or coefficients, along the discrete sine or cosine wave to be produced, as well as the constant b. The first data point y(0) provided to the sine/cosine generation module 412 has a predefined value of either zero (0) if a sine wave is desired or one (1) if a cosine wave is desired. The second data point y(1) provided to the sine/cosine generation module 412 is variable and determines the frequency of the discrete sine or cosine wave which is ultimately produced by the sine/cosine generation module 412. As shown in FIG. 4, the y(1) variable is provided to the sine/cosine generation module 412 by the coefficient generation module 410. That is, y(1) will either be A(n) or B(N), depending on whether values indicative of a sine wave or a cosine wave is desired at the output 430 of the sine/cosine generator 400. The relationship between the value of A(N), for example, generated by the coefficient generation module 410 and the values of the sine wave or cosine wave generated by the sine/cosine generation module 412 can best be understood with reference to FIG. 9.

Figure 9:
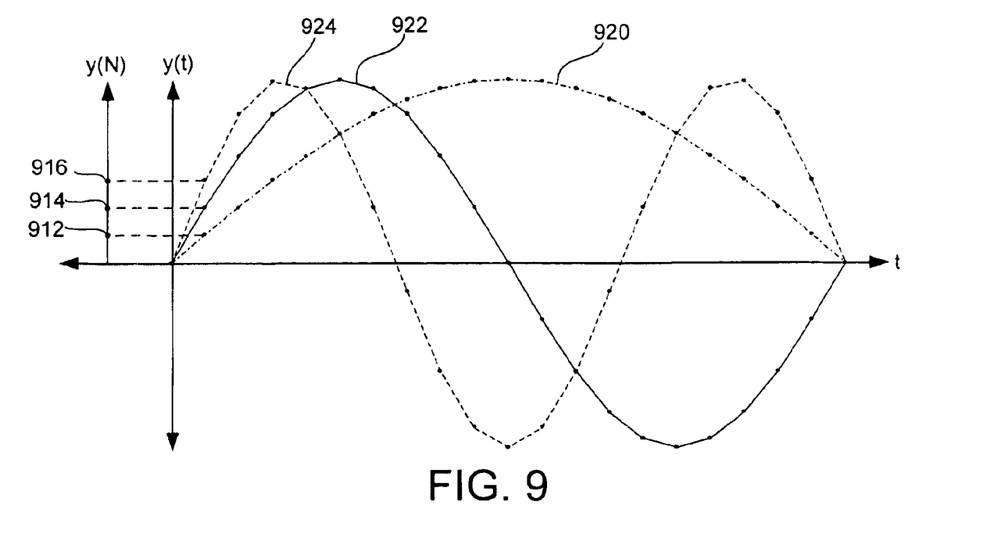
FIG. 9 depicts a graph of various data points generated by the coefficient generation module and the sine/cosine generation module shown in FIG. 4.

The coefficient generation module 410 generates a series of equally spaced discrete data points. Each of these data points is generated in succession by the coefficient generation module 410 according to the equation $\sin(2\pi N f_0 T)$, where N is indicative of the relative position of the data point in the series of data points generated. In this sense, the data points generated by the coefficient generation module 410 represent sine and cosine waves in the frequency domain. For simplicity, only the first three data points 912, 914, and 916, corresponding to N=1, N=2, and N=3, respectively are shown in FIG. 9. Also shown in FIG. 9 are three additional sets of data points 920, 922, and 924. The first 920 of the additional set of data points shown in FIG. 9 is representative of ½ of a sine wave, as generated by the sine/cosine generation module 412. The second of the additional set of data points 922 shown in FIG. 9 is representative of a sine wave having a frequency exactly double the frequency of the sine wave 920 represented by the first additional set of data points, as generated by the sine/cosine generation module 412. The third of the additional set of data points 924 shown in FIG. 9 is representative of a sine wave having a frequency exactly triple the frequency of the sine wave represented by the first additional set of data points 920, as generated by the sine/cosine generation module 412.

The set of additional data points 920 shown in FIG. 9 is illustrative of data points which have been generated by the sine/cosine generation module 412 in response to the value $B(N)=\sin(2\pi N f_0 T)$ being input to the sine/cosine generation module 412 as y(1) from the coefficient generation module 410, where N=1, and of the value of zero (0) being input to the sine/cosine generation module 412 as y(0). As will be apparent, the frequency of the sine wave 920 generated by the coefficient generation module 410 is identical to the frequency of the sine wave generated by the sine/cosine generation module 412.

The set of additional data points 922 shown in FIG. 9 is illustrative of data points which have been generated by the sine/cosine generation module 412 in response to the value $B(N)=\sin(2\pi N f_0 T)$ being input to the sine/cosine generation module 412 as y(1) from the coefficient generation module 410, where N=2, and of the value of zero (0) being input to the sine/cosine generation module 412 as y(0). The frequency of the sine wave 922 generated by the coefficient generation module 410 is now to twice frequency of the sine wave generated by the sine/cosine generation module 412.

Finally, the set of additional data points 924 shown in FIG. 9 is illustrative of data points which have been generated by the sine/cosine generation module 412 in response to the value $B(N)=\sin(2\pi N f_0 T)$ being input to the sine/cosine generation module 412 as y(1) from the coefficient generation module 410, where N=3, and of the value of zero (0) being input to the sine/cosine generation module 412 as y(0). The frequency of the sine wave 924 generated by the coefficient generation module 410 is now to twice frequency of the sine wave generated by the sine/cosine generation module 412. As can be seen from these examples, the frequency of the sine wave generated by the sine/cosine generation module 412 is related to the value of N in the coefficient generation module 410. Put another way, the frequency of the sine wave generated by the sine/cosine generation module 412 is N times $f_0$, where N is related to the number of iterations occurring in the coefficient generation module 410.

Figure 10:
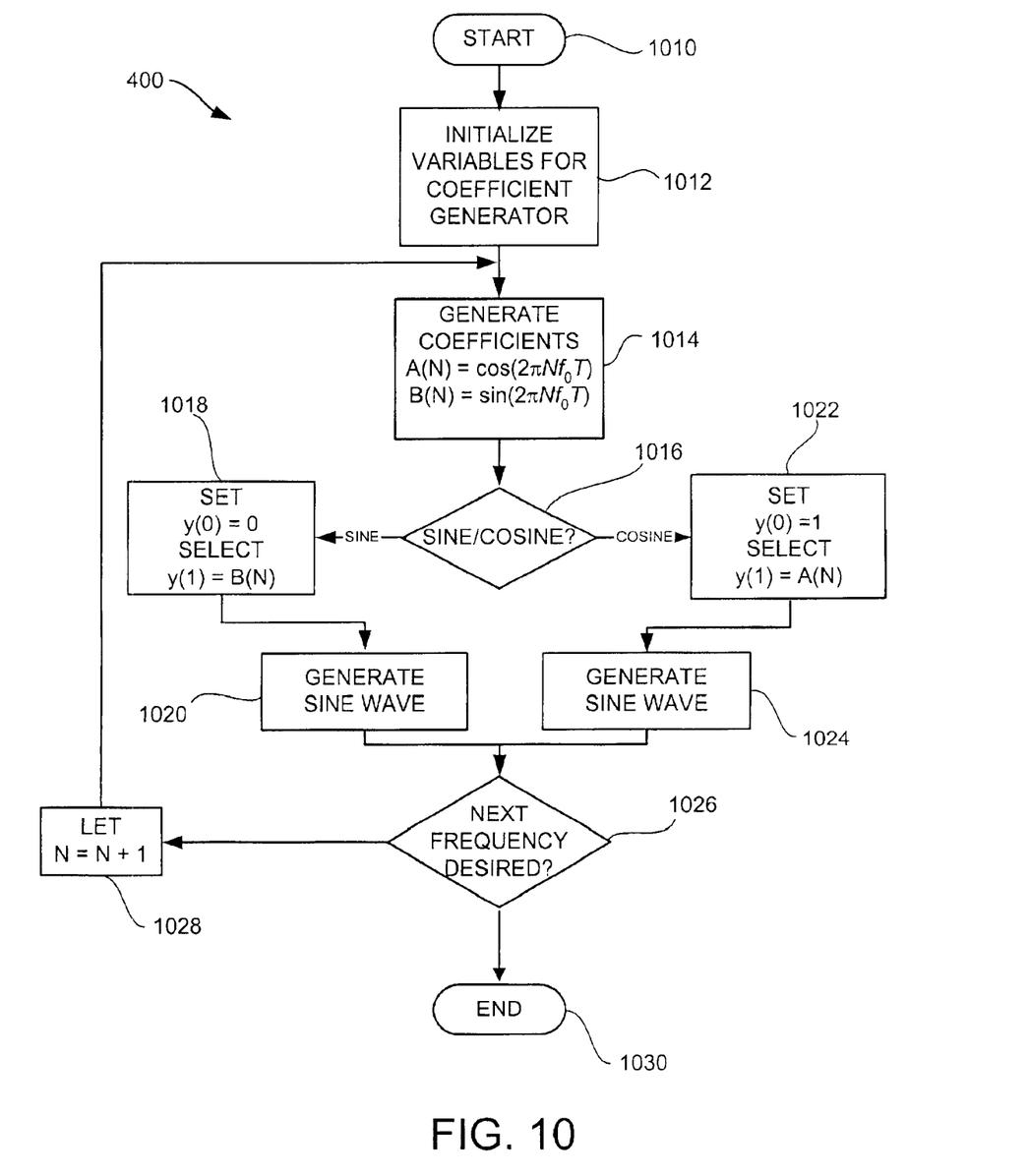
FIG. 10 depicts a flowchart for operations of the digital sine/cosine wave generator shown in FIG. 4.

Turning to FIG. 10, what is shown is an alternative representation of the present invention incorporating both the coefficient generation module 410 and the sine/cosine generation module 412. As shown in FIG. 10, following the start 1010 of operation of the sine/cosine generator 400, an initialization operation 1012 initializes variables for use by the coefficient generation module 410. For example, the initialization operation 1012 preferably initializes A(N) to $\cos(2\pi Nf_0T)$; B(N) to $\sin(2\pi Nf_0T)$; C to $\cos(2\pi f_0T)$; and D to $\sin(2\pi f_0T)$. Next, a generation operation 1014 generates values for A(N) and B(N) in accordance with the operations previously discussed with respect to FIG. 7 and FIG. 8. Sine/cosine determination operation 1016 then determines whether values representative of either a sine wave or a cosine wave are desired. If the sine/cosine determination operation 1016 determines that a sine wave is desired, set operation 1018 then sets y(0)=0, and selects B(N) for input as y(1) in the sine/cosine generation module 412, and a sine wave is generated by generate sine wave operation 1020. If the sine/cosine determination operation 1016 determines that a cosine wave is desired, set operation 1022 then sets y(1)=0, and selects A(N) for input as y(1) in the sine/cosine generation module 412, and a cosine wave is generated by the cosine wave operation 1024. After a sine or a cosine wave has been generated, next frequency determination operation 1026 determines if the next frequency of sine or cosine waves is desired. That is, the next frequency determination operation 1026 determines if the operational flow of the sine/cosine generator 400 should be continued such that another sine wave or cosine wave having a greater frequency should be generated. If the next frequency determination operation 1026 determines that the next frequency sine or cosine wave is desired, the operational flow of the sine/cosine generator 400 is returned to the generate coefficients operation 1014 and the operational flow of the sine/cosine generator 400 continues on as shown in FIG. 10 until a next frequency is no longer desired.

In summary, in view of the foregoing discussion it will be understood that a first embodiment of the present invention provides a digital sine/cosine generator (such as 400) having a coefficient generation module (such as 410) which is operable to generate a series of values. The digital sine/cosine generator also includes a sine/cosine wave generation module (such as 412) which is operable for receiving one of the values from the series of values generated by the coefficient generation module together with an initial value (such as 418 or 420) indicative of a starting point of a periodic waveform. The sine/cosine wave generation module preferably employs the initial value and the value received from the coefficient generation module to generate a sequence of values representative of a periodic waveform.

With respect to the series of values generated by the coefficient generation module, preferably these values are generated either by an implementation of the equation $A(N)=\cos(2\pi NFT)$ (such as 734) and/or by an implementation of the equation B(N) $\sin(2\pi NFT)$ (such as 736). Additionally, the series of values (such as 912, 914, and 916) generated by the coefficient generation module is preferably representative of a sine wave, wherein the initial value is zero, and wherein the sequence of values generated by the sine/cosine wave generation module is representative of another sine wave (such as 920, 922, or 924). The sine/cosine wave generation module of this first embodiment of the present invention preferably uses a discrete difference equation, such as $y(n)=b*y(n-1)-y(n-2)$, to generate the sequence of values representative of a periodic waveform, where y(n) represents the output signals of the sine/cosine generator at discrete time n, and b represents a predetermined constant.

The coefficient generation module in this first embodiment of the present invention preferably comprises a digital sine/cosine wave oscillator (such as 410) for generating N consecutive values of a sine wave. The coefficient generation preferably includes a first initializer (such as 812), a calculator (such as 814), an output (such as 816), and a second initializer (such as 820). The first initializer preferably sets a variable A equal to $\cos(2\pi FT)$, a variable B equal to $\sin(2\pi FT)$, a variable C equal to $\sin(2\pi FT)$, and a variable D equal to $\cos(2\pi FT)$. The calculator accesses the variables A, B, C, and D and calculates a value A(N)=AD+BC, and a value B(N)=AC−BD. The output then outputs the values A(N) and B(N) and the second initializer sets the variable A equal to the value A(N) and the variable B equal to the value B(N) prior to the beginning of the next calculation by the calculator.

Preferably, the coefficient generation module simultaneously generates a first series of values representative of a sine wave (such as 736) and a second series of values representative of a cosine wave (such as 734). The digital sine/cosine generator also preferably also includes a selector module (such as 422) selecting a value from either a first series of values representative of a sine wave or a second series of values representative of a cosine wave for receipt by the sine/cosine wave generation module.

Another embodiment of the present invention provides a computer-readable media having computer executable modules including a coefficient generation module (such as 410) and a discrete periodic waveform generation module (such as 412). The coefficient generation module preferably generates a first series of N consecutive values which may be characterized by the function $B(N)=\sin(2\pi NFT)$, wherein F is the base frequency of the function and T is the period between consecutive values. The discrete periodic waveform generation module preferably utilizes a difference equation to generate a sequence of consecutive values representative of discrete periodic waveform, using a predetermined value (such as 428) as a first initial condition for the difference equation and one of the values of the first series of N consecutive values (such as 736) as a second initial condition for the difference equation, such that frequency of the waveform generated by the discrete periodic waveform generation module has a frequency of N*F. Preferably, the difference equation in this embodiment of the present invention is characterized by $y(n)=b*y(n-1)-y(n-2)$, where y(n) represents the output signals of the periodic waveform generation module at discrete time n, and b=2cos $(2\pi FT)$.

The coefficient generation module in this embodiment preferably additionally generates a second series of N consecutive values (such as 734) which may be characterized by the function $A(N)=\cos(2\pi NFT)$. This embodiment of the present invention also preferably includes a computer executable selector module (such as 422) which is operable to select one of the values from either the first series of M consecutive values or the second series of N consecutive values as the second initial condition for the difference equation.

Yet another embodiment of the present invention involves a method of generating, using a discrete difference equation (such as 612), a sequence of values representative of a periodic waveform (such as 430). The method of this embodiment preferably includes the steps of comprising steps of selecting a first value representative of a first initial condition of the difference equation (such as 428), generating a second value representative of a second initial condition of the difference equation (such as 410), and calculating the sequence of values of the periodic waveform with the discrete difference equation using the first and the second values as initial conditions in the difference equation. The difference equation in this embodiment is preferably characterized by $y(n)=b*y(n-1)-y(n-2)$, where $y(n)$ represents the output signal of the sine/cosine generator at discrete time n, and b represents a constant.

The generating step in this embodiment of the invention preferably involves selecting one value from a series of values which may be characterized by the equation $B(N)=\sin(2\pi NFT)$, wherein F is the base frequency of the function and T is the period between consecutive values.

The generating step in this embodiment of the invention preferably comprises the steps of generating a first series of consecutive values (such as 418) which may be characterized by the function $B(N)=\sin(2\pi NFT)$, generating a second series of consecutive values (such as 420) which may be characterized by the function $A(N)=\cos(2\pi NFT)$, an selecting (such as 422) as the second initial condition for the difference equation one of the values from the first series of consecutive values or one of the values from the second series of consecutive values.

Additionally, the generating step in this embodiment may comprise the steps of setting a variable A equal to $\cos(2\pi FT)$, setting a variable B equal to $\sin(2\pi FT)$ setting a variable C equal to $\sin(2\pi FT)$, and setting a variable D equal to $\cos(2\pi FT)$ (such as 812). A value $A(N)=AD+BC$ and a value $B(N)=AC-BD$ are then calculated (such as 814) and output (such as 816). The variable A is then set equal to value of $A(N)$ and the variable B is set equal to equal to the values of $B(N)$ (such as 820). These steps (such as 814, 816, and 820) are then repeated a predetermined number of times. Finally, one of the outputted values is selected (such as 422) as the generated second value representative of the second initial condition of the difference equation.

Another embodiment of the present invention relates to a digital sine/cosine wave generator (such as 812) which includes a coefficient generator (such as 410) for generating a series of values and a sine/cosine generation means (such as 412) for receiving one of the series of values and for generating a sequence of values representative of either a sine wave or a cosine wave using the received value as an initial condition of a difference equation (such as 612).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the sine/cosine generator 400 may be employed in a system other than a disc drive device. Additionally, the sine/cosine generator 400 may be employed to generate a sine wave only or a cosine wave only. In such a case, the selector 422 shown and described with respect to FIG. 4 could be eliminated with the appropriate output of the coefficient generation module, either $A(N)$ or $B(N)$ going directly to the $y(1)$ input of the sine/cosine generation module 412. Numerous other changes may be made which will readily suggest themselves to those skilled in the art and which are encompassed in the spirit of the invention disclosed and as defined in the appended claims.

What is claimed is:

1. A digital sine/cosine generator comprising:
    a coefficient generation module generating a series of N values;
    a sine/cosine wave generation module receiving one of the values from the series of N values and receiving an initial value indicative of a starting point of a periodic waveform,
    wherein the sine/cosine wave generation module employs the initial value and the received value from the series of values to generate a sequence of values representative of a periodic waveform, and the series of values generated by the coefficient generation module is determined either by the equation $A(N)=\cos(2\pi NFT)$ or by the equation $B(N)=\sin(2\pi NFT)$, F being the frequency of the periodic waveform, and T being the period of time between consecutive values.

2. The digital sine/cosine generator of claim 1, wherein the series of values generated by the coefficient generation module is representative of a sine wave, wherein the initial value is zero, and wherein the sequence of values generated by the sine/cosine wave generation module is representative of another sine wave.

3. The digital sine/cosine generator of claim 1, wherein the sine/cosine wave generation module uses a discrete difference equation to generate the sequence of values representative of a periodic waveform.

4. The digital sine/cosine generator of claim 3, wherein the difference equation is $y(n)=b*y(n-1)-y(n-2)$, where $y(n)$ represents the output signals of the sine/cosine generator at discrete time n, and b represents a predetermined constant.

5. The digital sine/cosine generator of claim 1, wherein the coefficient generation module has a digital sine/cosine wave oscillator for generating N consecutive values of a sine wave of frequency F, the period between consecutive sample values being T seconds, the coefficient generation module comprising:
    a first initializer setting a variable A equal to $\cos(2\pi FT)$, setting a variable B equal to $\sin(2\pi FT)$, setting a variable C equal to $\sin(2\pi FT)$, and setting a variable D equal to $\cos(2\pi FT)$;
    a calculator operatively connected to the initializer, the calculator accessing variables A, B, C, and D and calculating every T seconds a value $A(N)=AD+BC$, and a value $B(N)=AC-BD$;
    an output outputting the values $A(N)$ and $B(N)$; and
    a second initializer setting the variable A equal to the value $A(N)$ and setting the variable B equal to the value $B(N)$ prior to the beginning of the next calculation by the calculator.

6. The digital sine/cosine generator of claim 1, wherein the coefficient generation module simultaneously generates a first series of values representative of a sine wave and a second series of values representative of a cosine wave.

7. The digital sine/cosine generator of claim 1, wherein the digital sine/cosine generator further comprising a selector module selecting for receipt by the sine/cosine wave generation module a value from either the first series of values representative of a sine wave or the second series of values representative of a cosine wave.

8. A computer-readable media having computer executable modules comprising:
    a coefficient generation module generating a first series of N consecutive values characterized by the function $B(N)=\sin(2\pi NFT)$, wherein F is the base frequency of the function and T is the period between consecutive values; and a discrete periodic waveform generation module utilizing a difference equation to generate a sequence of consecutive values representative of discrete periodic waveform, wherein the discrete periodic waveform generation module utilizes a predetermined value as a first initial condition for the difference equation and one of the values of the first series of N consecutive values as a second initial condition for the difference equation, such that frequency of the waveform generated by the discrete periodic waveform generation module has a frequency of N*F.

9. The computer-readable media of claim 8, wherein the difference equation is characterized by y(n)=b*y(n−1)−y(n−2), where y(n) represents the output signals of the periodic waveform generation module at discrete time n, and b=2cos (2πFT).

10. The computer-readable media of claim 9, wherein the coefficient generation module generates a second series of N consecutive values characterized by A(N)=cos(2πNFT).

11. The computer-readable media of claim 10, further comprising a computer executable selector module selecting one of the values from either the first series of N consecutive values or the second series of N consecutive values as the second initial condition for the difference equation.

12. The computer-readable media of claim 8, wherein zero is the predetermined value of the first initial condition, and wherein the periodic waveform generator generates a sine wave.

13. A method of generating, using a discrete difference equation, a sequence of values representative of a periodic waveform comprising steps of:

(a) selecting a first value representative of a first initial condition of the difference equation;

(b) generating a second value representative of a second initial condition of the difference equation by selecting one value from a series of values characterized by the function A(N)=cos(2πNFT) or by the function B(N)=sin(2πNFT); and (c) calculating the sequence of values of the periodic waveform with the discrete difference equation using the first and the second values as initial conditions in the difference equation, wherein F is the base frequency of the functions A(N) and B(N) and T is the period between consecutive values in the calculated sequence of values, and the difference equation is characterized by y(n)=b*y(n−1)−y(n−2), where y(n) represents the output signal of the sine/cosine generator at discrete time n, and b represents a constant.

14. The method of claim 13, wherein the generating step (b) comprises steps of:

(b)(1) generating a first series of consecutive values, the first series of values being characterized by the function B(N)=sin(2πNFT), wherein F is the base frequency of the function and T is the period between consecutive values;

(b)(2) generating a second series of consecutive values, the second series of values being characterized by the function A(N)=cos(2πNFT), wherein F is the base frequency of the function and T is the period between consecutive values; and (b)(3) selecting as the second initial condition for the difference equation one of the values from the first series of consecutive values or one of the values from the second series of consecutive values.

15. A method of generating, using a discrete difference equation, a sequence of values representative of a periodic waveform comprising steps of:

(a) selecting a first value representative of a first initial condition of the difference equation;

(b)(1) setting a variable A equal to cos(2πFT), setting a variable B equal to sin(2πFT), setting a variable C equal to sin(2πFT), and setting a variable D equal to cos(2πFT), wherein F is the base frequency of the periodic waveform and T is the period between consecutive values;

(b)(2) calculating a value A(N)=AD+BC and a value B(N)=AC−BD;

(b)(3) outputting the values A(N) and B(N);

(b)(4) setting the variable A equal to A(N) and the variable B equal to B(N);

(b)(5) repeating steps (b)(2), (b)(3), and b(4) a predetermined number of times; and (b)(6) selecting one of the outputted values as a second value representative of the second initial condition of the difference equation; and (c) calculating the sequence of values of the periodic waveform with the discrete difference equation using the first and the second values as initial conditions in the difference equation.

16. A digital sine/cosine wave generator comprising:

a coefficient generator generating a series of values; and a sine/cosine generation means for receiving one of the series of N values and for generating a sequence of values representative of either a sine wave or a cosine wave using the one of the series of values as an initial condition of a difference equation, wherein the series of values generated by the coefficient generation module is determined either by the equation A(N)=cos(2πNFT) or by the equation B(N)=sin(2πNFT), F being the frequency of the sine or cosine wave, and T being the period of time between consecutive values.

* * * * *